US012690953B2

(12) United States Patent
Weitzel et al.

(10) Patent No.: US 12,690,953 B2
(45) Date of Patent: Jul. 28, 2026

(54) DENTAL COMPONENT WITH THROUGH HOLE

(71) Applicant: Nobel Biocare Services AG, Kloten (CH)

(72) Inventors: Jörg Weitzel, Rielasingen-Worblingen (DE); Javier Ratia Garcia, Zurich (CH)

(73) Assignee: Nobel Biocare Services AG, Kloten (CH)

( * ) Notice: Subject to any disclaimer, the term of this patent is extended or adjusted under 35 U.S.C. 154(b) by 78 days.

(21) Appl. No.: 18/573,038

(22) PCT Filed: May 23, 2022

(86) PCT No.: PCT/EP2022/063886
§ 371 (c)(1),
(2) Date: Dec. 21, 2023

(87) PCT Pub. No.: WO2022/268421
PCT Pub. Date: Dec. 29, 2022

(65) Prior Publication Data
US 2024/0366344 A1 Nov. 7, 2024

(30) Foreign Application Priority Data

Jun. 23, 2021 (EP) ..................................... 21181294

(51) Int. Cl.
*A61C 13/00* (2006.01)
*A61C 8/00* (2006.01)
(Continued)

(52) U.S. Cl.
CPC ........ *A61C 13/0004* (2013.01); *A61C 8/0012* (2013.01); *A61C 8/0036* (2013.01);
(Continued)

(58) Field of Classification Search
None
See application file for complete search history.

(56) References Cited

U.S. PATENT DOCUMENTS 4,830,615 A * 5/1989 Goldstein ................ A61C 3/06
433/229
5,015,186 A * 5/1991 Detsch ................. A61C 8/0001
433/18
(Continued)

FOREIGN PATENT DOCUMENTS

CN 108392278 A * 8/2018 .......... A61C 8/0037
DE 8101875 U1 * 5/1981
(Continued)

OTHER PUBLICATIONS

Machine Translation of WO2022195417A1, Sep. 2022 (Year: 2022).*
European Patent Office; Search Report in related International Patent Application No. PCT/EP2022/063886 dated Aug. 31, 2022.

*Primary Examiner* — Jeffrey A Vonch
(74) *Attorney, Agent, or Firm* — Firm Foundation IP LLC

(57) ABSTRACT

The disclosure presents a method of manufacturing a dental component (110; 210; 410; 510) with an angulated channel (170; 270; 470; 570) and for being mounted to a dental implant is disclosed. The dental component has a coronal side (130; 230; 430; 530) and an apical side (120; 220; 420; 520). The method comprises the steps of forming a first hole (140; 240; 340; 440) and a second hole (150; 250; 450; 550). The first hole substantially extends along a first axis (141; 241; 341; 441; 541) and is formed as a blind hole having an end region (143; 243; 343; 443; 543). The second hole substantially extends along a second axis (151; 251; 451; 551), wherein the entrance to the second hole is located coronally to and intersecting the end region of the first hole for creating the angulated channel. The first axis and the second axis are inclined with respect to each other. At least (Continued)

a part of the end region of the first hole is kept as a part of the angulated channel. The disclosure also relates to dental component that is preferably manufactured by this method and to a method of designing a dental component with an angulated channel using CAD/CAM.

19 Claims, 3 Drawing Sheets

(51) Int. Cl.

| | |
|---|---|
| *A61C 13/08* | (2006.01) |
| *A61C 13/083* | (2006.01) |
| *B23B 51/00* | (2006.01) |
| *A61C 3/02* | (2006.01) |
| *A61C 13/10* | (2006.01) |
| *A61C 13/225* | (2006.01) |
| *B29L 31/00* | (2006.01) |

(52) U.S. Cl.
CPC .......... *A61C 8/0068* (2013.01); *A61C 8/0069* (2013.01); *A61C 13/0006* (2013.01); *A61C 13/0022* (2013.01); *A61C 13/08* (2013.01); *A61C 13/083* (2013.01); *B23B 51/0027* (2013.01); *B23B 51/009* (2013.01); *A61C 3/02* (2013.01); *A61C 8/0009* (2013.01); *A61C 8/0018* (2013.01); *A61C 8/0048* (2013.01); *A61C 8/005* (2013.01); *A61C 8/0053* (2013.01); *A61C 8/0054* (2013.01); *A61C 13/10* (2013.01); *A61C 13/225* (2013.01); *B23B 2215/00* (2013.01); *B23B 2220/00* (2013.01); *B23B 2220/32* (2013.01); *B23B 2226/18* (2013.01); *B23B 2229/08* (2013.01); *B29C 2793/00* (2013.01); *B29L 2031/7536* (2013.01); *Y10T 428/24008* (2015.01); *Y10T 428/24273* (2015.01); *Y10T 428/24744* (2015.01); *Y10T 428/249923* (2015.04)

(56) References Cited

U.S. PATENT DOCUMENTS

| | | | | | |
|---|---|---|---|---|---|
| 5,116,225 | A | * | 5/1992 | Riera | A61C 8/006 433/173 |
| 5,662,474 | A | * | 9/1997 | Jorneus | A61C 8/0068 433/172 |
| 6,663,388 | B1 | * | 12/2003 | Schar | A61C 8/0069 433/173 |
| 2002/0031749 | A1 | * | 3/2002 | Morgan | A61C 8/0069 433/172 |
| 2003/0162149 | A1 | * | 8/2003 | Bjorn | A61C 8/005 433/141 |
| 2006/0210949 | A1 | * | 9/2006 | Stoop | A61B 17/1673 433/165 |
| 2008/0311544 | A1 | * | 12/2008 | Lee | A61C 8/0089 433/141 |
| 2009/0117520 | A1 | * | 5/2009 | Kikuchi | A61C 8/005 433/174 |
| 2009/0130629 | A1 | * | 5/2009 | Towse | A61C 8/005 433/174 |
| 2009/0298013 | A1 | * | 12/2009 | Baruc | A61C 8/0065 433/174 |
| 2010/0129165 | A1 | * | 5/2010 | Hughes | B23C 5/1036 407/42 |
| 2011/0171603 | A1 | * | 7/2011 | Kim | A61C 8/005 433/201.1 |
| 2012/0246916 | A1 | * | 10/2012 | Farre | A61C 8/005 29/700 |

| | | | | | |
|---|---|---|---|---|---|
| 2013/0164708 | A1 | * | 6/2013 | Streff | A61C 8/0048 433/174 |
| 2014/0065574 | A1 | * | 3/2014 | Benzon | A61C 13/0006 433/201.1 |
| 2014/0147812 | A1 | * | 5/2014 | Ilter | A61C 8/0022 433/174 |
| 2014/0178836 | A1 | * | 6/2014 | Haus | A61K 6/802 433/173 |
| 2014/0186797 | A1 | * | 7/2014 | Haus | A61C 8/0068 433/173 |
| 2014/0349250 | A1 | * | 11/2014 | Elsner | A61C 13/0013 433/174 |
| 2015/0250557 | A1 | * | 9/2015 | Simmons, Jr. | A61C 1/084 433/118 |
| 2016/0022390 | A1 | * | 1/2016 | Spindler | A61C 13/0022 433/167 |
| 2016/0213450 | A1 | * | 7/2016 | Xam-Mar Mangrane | A61C 8/0068 |
| 2016/0242877 | A1 | * | 8/2016 | Bernhard | A61C 13/0018 |
| 2017/0086952 | A1 | * | 3/2017 | Aravena | A61C 8/005 |
| 2017/0105819 | A1 | * | 4/2017 | Ekström | A61C 8/0053 |
| 2017/0224447 | A1 | * | 8/2017 | Richard | A61C 8/0062 |
| 2017/0231726 | A1 | * | 8/2017 | Baruc | A61C 8/006 433/173 |
| 2018/0133808 | A1 | * | 5/2018 | Wang | B23B 51/02 |
| 2018/0140395 | A1 | * | 5/2018 | Xam-Mar Mangrane | A61C 8/006 |
| 2018/0206945 | A1 | * | 7/2018 | Haus | A61C 8/0057 |
| 2019/0029779 | A1 | * | 1/2019 | Vonwiller | A61C 8/0054 |
| 2019/0038418 | A1 | * | 2/2019 | Eliopoulos | A61F 2/30749 |
| 2019/0076220 | A1 | * | 3/2019 | Anitua Aldecoa | A61C 8/0068 |
| 2019/0365510 | A1 | * | 12/2019 | Richard | A61C 8/0062 |
| 2020/0015940 | A1 | * | 1/2020 | Fischler | A61C 8/0048 |
| 2020/0038148 | A1 | * | 2/2020 | Bilodeau | A61C 8/0068 |
| 2020/0046468 | A1 | * | 2/2020 | Pappas | A61C 8/009 |
| 2020/0093578 | A1 | * | 3/2020 | Spindler | A61C 8/006 |
| 2020/0214796 | A1 | * | 7/2020 | Weitzel | A61C 8/0069 |
| 2020/0289243 | A1 | | 9/2020 | Jinton | |
| 2020/0400196 | A1 | * | 12/2020 | Giorno | F16D 3/185 |
| 2021/0068933 | A1 | * | 3/2021 | Connell | A61C 8/006 |
| 2021/0128278 | A1 | * | 5/2021 | Richard | A61C 8/0012 |
| 2021/0386526 | A1 | * | 12/2021 | Storni | A61C 8/0059 |
| 2021/0393377 | A1 | * | 12/2021 | Connell | A61C 8/0001 |
| 2022/0016722 | A1 | * | 1/2022 | Ciurana De Arcos | A61C 1/084 |
| 2022/0339714 | A1 | * | 10/2022 | Kraus | B23B 51/009 |
| 2024/0315810 | A1 | * | 9/2024 | Richard | A61C 8/005 |

FOREIGN PATENT DOCUMENTS

| | | | | | |
|---|---|---|---|---|---|
| DE | 102017202407 | A1 | * | 8/2018 | A61C 3/02 |
| DE | 102017106061 | A1 | * | 9/2018 | A61C 8/00 |
| EP | 2380525 | A1 | * | 10/2011 | A61C 8/0051 |
| GB | 2494099 | A | | 3/2013 | |
| IT | 202100013127 | A1 | * | 11/2022 | A61C 3/02 |
| JP | 2014147431 | A | * | 8/2014 | |
| JP | 2020533085 | A | | 11/2020 | |
| KR | 20090014835 | A | * | 2/2009 | A61C 3/02 |
| KR | 20130084387 | A | * | 7/2013 | A61C 8/0059 |
| KR | 20130097820 | A | * | 9/2013 | A61C 8/00 |
| KR | 101758803 | B1 | * | 7/2017 | A61C 8/0089 |
| KR | 20190010974 | A | * | 2/2019 | A61C 8/0068 |
| KR | 20190131351 | A | * | 11/2019 | A61B 17/1622 |
| SE | 1300425 | A1 | * | 12/2014 | A61C 13/0004 |
| WO | WO-9960945 | A1 | * | 12/1999 | A61C 31/30 |
| WO | WO-2008051163 | A1 | * | 5/2008 | A61C 8/009 |
| WO | WO-2010044540 | A2 | * | 4/2010 | A61C 13/0009 |
| WO | WO-2013004387 | A1 | * | 1/2013 | A61C 8/0048 |
| WO | WO-2013164068 | A1 | * | 11/2013 | A61C 3/02 |
| WO | WO-2014200404 | A1 | * | 12/2014 | A61C 13/081 |
| WO | WO-2018037144 | A1 | * | 3/2018 | A61C 13/08 |
| WO | WO-2018130730 | A1 | * | 7/2018 | G01R 27/2605 |
| WO | WO-2019063127 | A1 | * | 4/2019 | B23Q 3/061 |
| WO | WO-2022195417 | A1 | * | 9/2022 | |

* cited by examiner

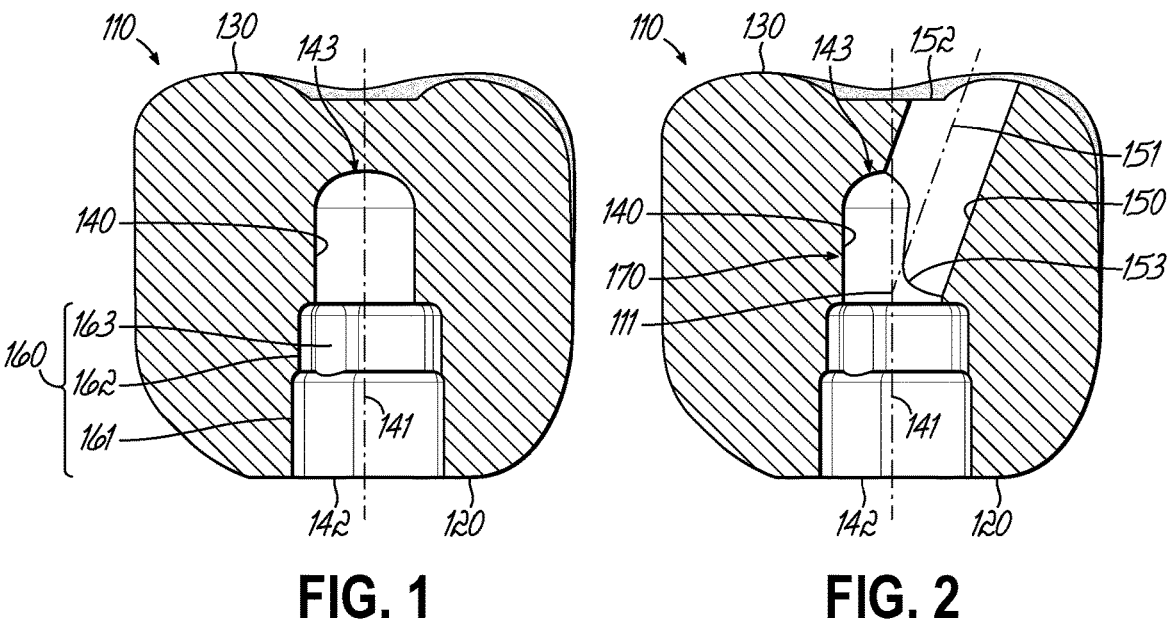
FIG. 1                    FIG. 2
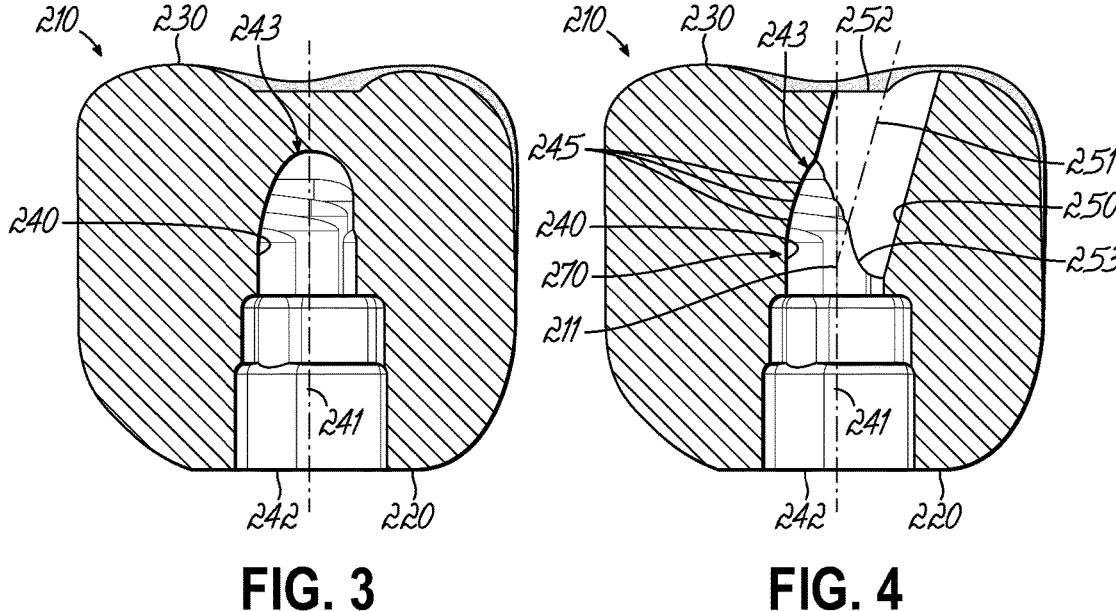
FIG. 3                    FIG. 4

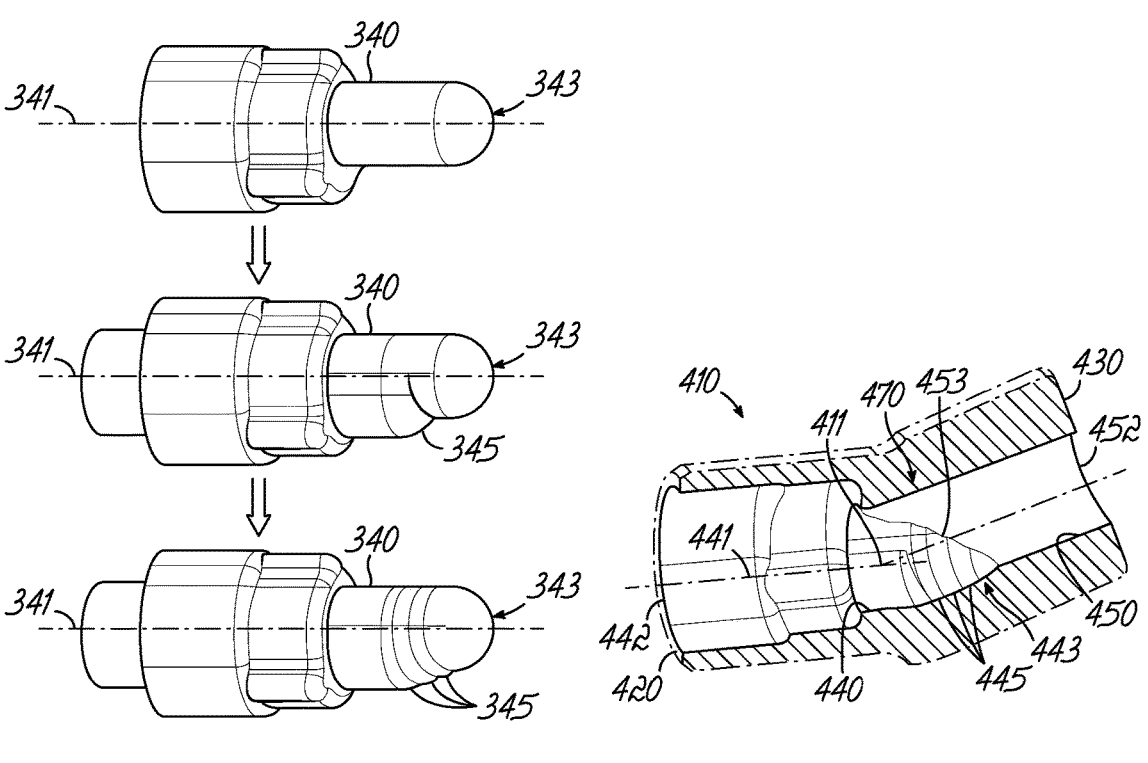
FIG. 5
FIG. 6
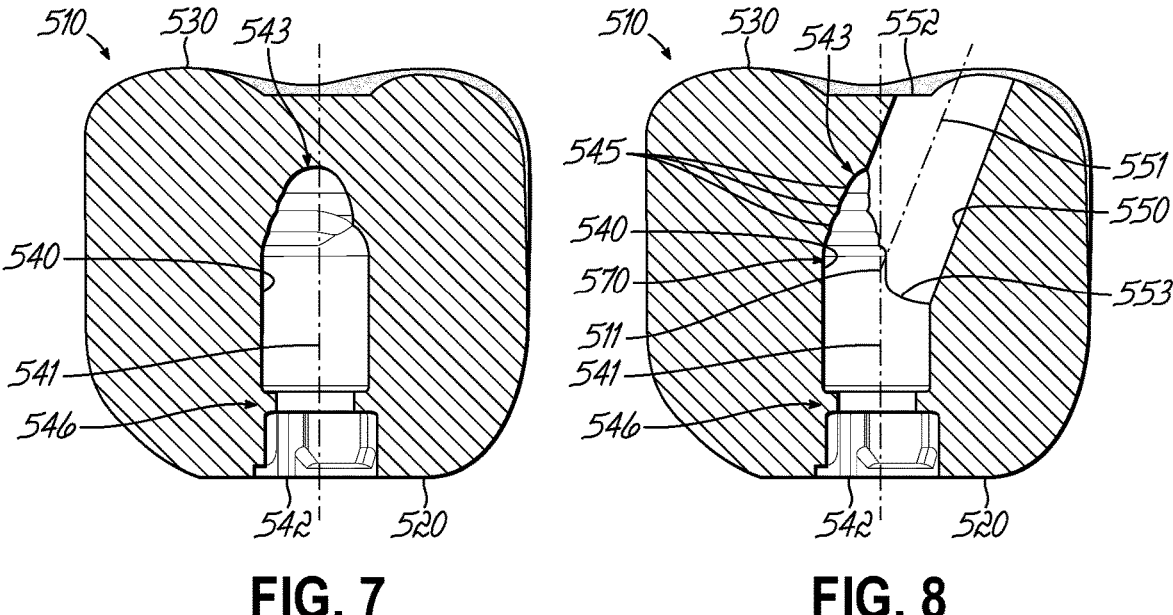
FIG. 7
FIG. 8

DENTAL COMPONENT WITH THROUGH HOLE

TECHNICAL FIELD

The present invention relates to a method of manufacturing a dental component with an angulated channel, a dental component, and a method of creating a dental component using CAD/CAM.

BACKGROUND OF THE INVENTION

Dental restorations of at least one tooth that are anchored within the bone tissue of a patient via a dental implant represent the enhanced treatment available to patients. This technique has been developed to an extent that delivers durable and aesthetically pleasing results. In order to achieve these results, there are numerous product portfolios and system available.

Despite these numerous systems, there are still challenges to overcome in order to enhance manufacturing and to make these treatments available at a lower cost. One of these challenges is the placement and production of channels extending through a dental component for fastening the dental component to a dental implant or to an abutment. These channels basically have an entrance exposed to the oral cavity of a patient. Although these entrances are filled after installation of the dental restoration, it is advantageous if they are not or at least hardly visible when the teeth of a patient are visible during an everyday situation. This is of particular importance if a dental restoration is concerned with the front teeth of a patient.

A particular challenge in this respect exists if a dental restoration is a one-piece restoration made of ceramic since a channel for fastening the restoration has to be manufactured into the restoration. Further, such a channel should be angulated for its entrance being invisibly arranged on the lingual side in case of a front tooth. The creation of such an angulated channel remains to be a particular challenge during production although there have been suggestions on how to approach this problem.

For example, EP 2 053 985 B3 proposes a manufacturing method for a dental superstructure comprising a screw-channel through which screw-channel a screw member is to be inserted, and a screw member seat for providing support to the head of said screw member during fixation of said dental superstructure to a spacer element or an implant. Said dental superstructure is provided with a central axis of said screw-channel and a central axis of said second mouth that at least partly do not coincide, i. e. the screw-channel is not extending along a straight line through the dental super-structure. Another technique for providing an angulated channel is disclosed in EP 3 378 434 Bl. Both techniques require highly specialized manufacturing gear for creating these channels.

SUMMARY OF THE INVENTION

Besides the specialized tools needed for creating an angulated channel, it is also a challenge to design and manufacture such a channel so that a fastening element can easily be inserted and be removed.

Thus, an underlying objective of this disclosure has been to provide a dental component with an angulated channel that addresses above-noted problems. Further objectives have been a method of manufacturing such a dental component and a method of creating a dental component for manufacturing.

Yet another objective has been to design and manufacture a dental component with an angulated channel that is compact in order to avoid affecting the integrity and stability of the dental component.

Accordingly, the disclosure relates to a method of manufacturing a dental component with an angulated channel and for being mounted to a dental implant, wherein the dental component has a coronal side and an apical side, the method comprising the steps of forming a first hole substantially extending along a first axis, the first hole having an end region, and forming a second hole substantially extending along a second axis, an entrance to the second hole being located coronally to the end region of the first hole. The first hole and the second hole are formed to intersect each other for creating the angulated channel. In other words, the first axis and the second axis are inclined with respect to each other. At least a part of the end region of the first hole is kept as a part of the angulated channel.

In other words, at least a part of the intersection between the first hole and the second hole is formed by the coronal end region of the first hole (i. e. it results from forming the first hole).

Further, the angulated channel is particularly configured for insertion of a fastening element such as a dental screw.

Due to a part of the end region of the first hole being kept at the inter-section between the first hole and the second hole as part of the angulated channel, sufficient space is provided for a fastening element to pass between the first hole and the second hole. The end region preferably allows the fastening element to pass the transition from the second hole to the first hole, i. e. to change its direction while being inserted.

The end region is preferably located on a side that is basically opposite to the entrance to the second hole. In other words, when looking into the second hole in the apical direction of the second axis, at least a part of the end region of the first hole is visible.

The first hole is particularly machined like a blind hole. Accordingly, the end region of the first hole by itself (i.e. without taking the second hole into consideration, independent of the second hole being machined before or after the first hole) is preferably dome-shaped.

The first hole and/or the second hole are preferably formed so that the hole(s) may be formed in a single process step (i. e. a tool starts to process the dental component and is only retracted when the hole(s) is/are formed).

The dental component may inter alia be a dental restoration, an abutment, a crown, bridge or a spacer. The dental component may be attached directly or indirectly to a dental implant.

The end region of the first hole is preferably formed such that it is located coronally to a point of intersection between the first axis and the second axis.

The change in slope of the profile of the transition between an apical portion of the first hole and the end region of the first hole is preferably smaller than the change in slope of the transition between the end region of the first hole and the second hole.

In a cross-section extending along the first axis, the profile of the end region particularly comprises at least one curved concave portion, wherein at least a section of the at least one curved concave portion preferably forms a part of the angulated channel of the dental component. In case of the end region comprising multiple (i. e. more than one) curved concave portions, these portions are particularly transitioning from one to another. The first hole is preferably formed before the second hole. Nonetheless, it is also possible to form the second hole before the first hole.

An angle of inclination between the first and second axes is preferably greater than 0° or 5° and equal to or less than 60°, 30° or 20°.

The first hole and the second hole may be formed by cutting or grinding, in particular by using a rotating tool.

Preferably, a rotating tool performs a wobbling motion while creating the first hole, the rotating tool being guided along at least one path about the first axis, wherein a longitudinal axis of the rotating tool is preferably arranged at an angle, preferably a constant angle, to the first axis.

Even more preferably, the first hole is formed by orbital milling along at least one path about the first axis, wherein the rotating tool is particularly oriented parallel to the first axis.

The blank used for manufacturing the dental component is preferably a green body made of a ceramic material.

The disclosure further provides a dental component that is preferably manufactured in the previously described manner. The dental component comprises an apical side, a coronal side, a first hole substantially extending along a first axis, the first hole having an end region, and a second hole substantially extending along a second axis, the entrance to the second hole being located coronally to the end region of the first hole. The first hole and the second hole intersect each other forming an angulated channel (e. g. the first hole (first axis) and the second hole (second axis) are inclined relative to each other). At least a part of the intersection between the first hole and the second hole is located in the end region of the first hole. In other words, the line of intersection between the first hole and the second hole is at least partly located in the end region of the first hole.

A diameter of the first hole may be equal to or larger than a diameter of the second hole.

It is particularly preferred that the first axis and/or the second axis is straight.

The end region of the first hole may have a decreasing cross-section perpendicular to the first axis.

In a cross-section extending along the first axis, the profile of the end region may be curved (i.e., rounded), wherein the curved profile preferably comprises multiple curved concave portions.

The angulated channel of the dental component may have a conical screw seat.

The end region of the first hole may be located coronally to a point of intersection between the first axis and the second axis.

The present disclosure further provides a method of designing a dental component using CAD (i.e., a CAD system). The method comprises the steps of providing geometric data of a dental component, providing a first hole geometry in the dental component, wherein the first hole extends substantially along a first axis and has an end region, creating a second hole in the dental component substantially extending along a second axis, wherein an entrance to the second hole is located coronally to the coronal end region of the first hole. The first hole and the second hole are created to intersect each other for creating the angulated channel. In particular, the first axis and the second axis are inclined with respect to each other. Further, at least a part of the end region of the first hole is kept as a part of the angulated channel.

The end region of the first hole is preferably formed such that it is located coronally to a point of intersection between the first axis and the second axis.

BRIEF DESCRIPTION OF THE DRAWINGS

The following figures illustrate preferred embodiments of the present disclosure. These embodiments are not to be construed as limiting but merely for enhancing the understanding of the invention in context with the following description. In these figures, same reference signs refer to features throughout the drawings that have the same or an equivalent function and/or structure. This particularly applies to reference signs that are identical in the last two digits, wherein the preceding digits denote the embodiment. It is to be noted that a repetitive description of these components is generally omitted for reasons of conciseness of the description.

FIG. 1 is a cross-sectional view of a dental component comprising a first dome-shaped hole according to a first embodiment.

FIG. 2 is a cross-sectional view of the dental component of FIG. 1 further comprising a second hole, wherein the first and second holes form an angulated channel.

FIG. 3 is a cross-sectional view of a dental component comprising a dome-shaped first hole according to a second embodiment.

FIG. 4 is a cross-sectional view of the dental component of FIG. 3 further comprising a second hole, wherein the first and second holes form an angulated channel.

FIG. 5 are perspective views illustrating various first holes of a dental component.

FIG. 6 is a cross-sectional view of an angulated channel of a dental component.

FIG. 7 is a cross-sectional view of a dental component according to another embodiment.

FIG. 8 is a cross-sectional view of the dental component of FIG. 7 further comprising a second hole, wherein the first and second holes form an angulated channel.

DETAILED DESCRIPTION

Figure 9A:
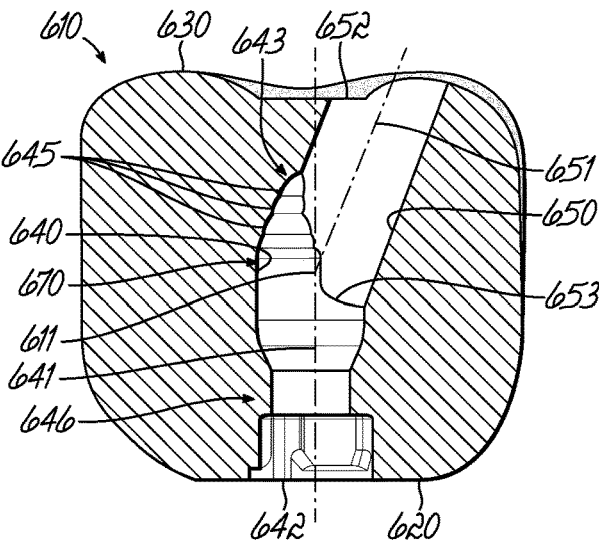
FIGS. 9A and 9B are cross-sectional views, schematically illustrating the creation of a dome-shaped end region of a first hole using a rotating tool that performs a wobbling motion.

In the following, exemplary embodiments of dental components will be described that generally comprise an angulated through-hole and that are configured to be mounted directly or indirectly on a dental implant.

FIGS. 1 and 2 illustrate two manufacturing steps of a dental component 110 according to a first embodiment. Turning to FIG. 1, the dental component 110 comprises a first, apical side 120 and a second, coronal side 130.

At the apical side 120, the dental component 110 preferably comprise a first entrance (opening) 142. At this entrance 142, a first hole 140 substantially extends along a first axis 141 in a coronal direction (i. e. a direction that has a coronal component and may have a lateral component, i. e. a buccal, labial and/or lingual component). The first axis 141 is preferably straight.

The first hole 140 is formed as a blind hole which has an end region 143, i.e., it is formed as a hole that does not extend throughout the dental component 110. During manufacturing, a tool (preferably a rotating tool, such as a milling or drilling tool) is guided from the apical side 120 along the first axis 141 to generate the first hole 140, in particular by cutting or grinding. However, machining the dental component 110 is stopped before a tip of the tool guided into the material of the dental component 110 reaches the side or surface of the dental component opposite to the apical side 120.

Within the dental component, the first hole 140 comprises an end region 143 that is dome-shaped. This dome-shaped end region is defined by a change in cross-section of the first hole 140. In particular, the end region 143 has a rounded or curved profile in a cross-section along the first axis 141. Preferably, the rounded profile of the end region 143 includes at least one curved concave portion.

The dental component 110 is preferably configured to be directly attachable to a dental implant (not shown) via the apical side 120. Nonetheless, it may also be configured to be indirectly attachable to a dental implant via an intermediate dental component (not shown) such as a spacer.

For attachment, the first hole 140 may comprise an attachment region 160 for attachment to a dental implant that is located apically to the end region 143. In other words, the optional attachment region 160 is arranged between the end region 143 and the first entrance 142 to the first hole 140 at the apical side 120. It may be part of the first entrance (e. g. FIGS. 1 to 4) or be at a distance to the first entrance 142 (e. g. the two lower figures of FIG. 5).

The attachment region 160 may comprise sections of various diameters 161, 162 along the first axis 141. The attachment region may include indexing means 163 to at least limit the options for a relative orientation between the dental component 110 and another dental component to be attached thereto (e. g. dental implant or intermediate dental component). The attachment region 160 may be designed to be a universal attachment region 160 for various dental components.

The dental component 110 may be a dental restoration (see FIGS. 1 to 4, 7, 8, and 10) or an abutment (see FIG. 6). In particular in case of a dental restoration, the dental component 110 is preferably made of a ceramic material and is even preferably manufactured in accordance with the present disclosure as a green body, i.e., at least before a final sintering step is applied.

Turning to FIG. 2, the dental component 110 of FIG. 1 is shown but now also includes a second entrance 152 that is arranged coronally to the first entrance 142 and, in particular, coronally to the end region 143 of the dental component 110. The second entrance 152 preferably faces in a coronal direction. The second entrance 152 forms an end of a second hole 150. The second hole substantially extends along a second axis 151.

As shown in FIG. 2, the second entrance 152 is preferably arranged coronally to the intersection between the first hole 140 and the second hole 150.

Although FIG. 2 indicates that the second hole 150 is formed after forming the first hole 140, this does not have to be the case. To the contrary, the first hole 140 may also be manufactured after the second hole 150 or even at the same time.

The second entrance 152 from which the second hole 150 extends may be formed on the coronal side 130, the lingual side, or the buccal side of the dental component 110.

The second hole 150 substantially extends along a second axis 151 that is inclined with respect to the first axis 141 of the first hole 140. The angle of inclination between the first axis 141 and the second axis 151 is greater than 0° and equal to or less than 60°. Preferably, the inclination angle is less than 40° or most preferably less than 30°. The first and the second axis 141, 151 may either or both be formed as straight and/or curved lines.

The first hole 140 and the second hole 150 intersect each other inside the dental component 110. In other words, the first axis 141 of the first hole 140 and the second axis 151 of the second hole 150 preferably intersect each other at an intersection point 111 so that the first hole 140 and the second hole 150 intersect each other. Nonetheless, the first hole 140 and the second hole 150 may also be formed such that the respective axes do not intersect each other at a point of intersection as long as the first hole 140 and the second hole 150 do intersect.

The first hole 140 and the second hole 150 are formed so that at least a part of the end region 143 of the first hole 140 is kept. In other words, when the first and the second hole are formed, a portion of the end region 143 of the first hole 140 still extends radially from the second hole 150. In particular, the end region 143 is located in a first radial direction starting from the second axis 151. This end region 143 is basically located on a side of the first hole 140 opposite to the side of the coronal entrance 152 of the second hole 150. Further, in a second radial direction opposite to said first radial direction, the apical end of the second hole 150 is intersecting the first hole 140 apart from the end region 143, in particular a cylindrical portion of the first hole 140 (cf. FIGS. 2, 4, 6, 8, and 9A).

The intersection between the first hole 140 and the second hole 150 is defined by an intersecting contour or line of intersection 153. The line of intersection 153 is at least partially formed by at least a portion of the end region 143 of the first hole 140. The first hole 140 and second hole 150 intersecting each other together form an angulated channel 170 which extends throughout the dental component 110.

The line of intersection 153 is preferably formed at the end region 143 so that starting at the most coronal point of this line, the two opposite directions of the line of intersection 153 running towards the apical side 120 of the dental component 110 move apart from each other, i. e. the end region becomes wider towards the apical side 120, in particular in a monotonic fashion (e. g. monotonically non-decreasing).

The entrance 152 of the second hole 150 allows for a fastening element (not shown) such as a dental screw to be introduced into the angulated channel 170 and, thus, into the dental component 110. The fastening is for attaching dental component 110 to a dental implant. For this attachment, the dental component may have a screw seat (cf. FIGS. 5, 7, and 8). It is also possible that the angulated channel serves for passing a fastening element to a screw seat. For example, the attachment regions 160 and 260 of the dental components 110 and 210, respectively, may serve for an installation to an abutment (e. g. by an adhesive or cement) that in turn comprises a screw seat.

In the apical direction of the angulated channel 170, the cross-section of the angulated channel 170 increases in size after the line of intersection 153 due to a portion of the end region 143 of the first hole 140 being kept. This increase in size allows a fastening element (in particular the head of a fastening element) to easily pass from the first hole 140 into the second hole 150 (during assembly) and vice versa (during disassembly).

Thus, the arrangement of the first and second holes 140, 150 is configured to provide sufficient space for a fastening element to pass through the angulated channel. The space created at the intersection of the first hole 140 and the second hole 150 inside the dental component 110 particularly allows for a rotational movement of the fastening element about an axis that is substantially perpendicular to the first axis 141 and the second axis 151. This rotation allows for and results in a repositioning of the fastening element in order to switch from a movement along the second axis 151 to a movement along the first axis 141 or vice versa.

The second hole 150 is preferably formed with the same diameter as the first hole 140. The second hole 150 may also be formed with a diameter which is smaller than the diameter of the first hole 140. The latter provides for a smaller entrance 152 to the angulated channel 170, which is easier to hide and less visible to an observer.

The dental component 110 and more particularly the angulated channel 170 is manufactured by forming a first hole 140 starting from a first, in particular apical side 120 of the dental component 110 and by guiding a tool substantially along a first axis 141. Similarly, the second hole 150 is formed starting from a side of the dental component 110 facing in an opposite direction (i.e. a direction differing by more than 90°) by guiding a tool substantially along a second axis 151. Manufacturing the dental component 110 is preferably performed using at least one rotating tool.

As described above, the first hole 140 is particularly formed as a blind hole having a coronal end region 143 with a reduced cross-section perpendicular to the first axis 141. The reduced cross-section preferably results from a curved contour of the first hole's end region 143 in a cross-section extending along the first axis 141. This curved contour allows for an enhanced stress distribution and, thus, strength of the dental component 110. Further, the end region 143 having a curved contour represents an enhanced approximation to the insertion path of a fixation element than other (e. g. linear) contours. Accordingly, less material is removed for providing a smooth insertion process and the strength of the dental component 110 is less affected. Nonetheless, the end region 143 may also comprise substantially the same cross-section as the first hole 140 (cf. FIG. 6), particularly in case of a non-ceramic material such as a metal.

The change in slope at the transition between an apical portion of the first hole 140 and the end region 143 of the first hole 140 is preferably smaller than the change in slope at the transition between the end region 143 of the first hole 140 and the second hole 150.

The first hole 140 and the second hole 150 are formed such that the holes intersect each other and form an angulated channel 170. In other words, the first hole 140 and the second hole 150 are formed such that the first axis 141 and the second axis 151 intersect each other at an intersection point 111. However, the first hole 140 and the second hole 150 may also be formed such that the axes do not intersect each other in a defined point. The first and second holes are formed with respect to each other that at least a part of the end region of the first hole is kept as a part of the angulated channel.

The first axis 141 and the second axis 151 are inclined with respect to each other. The inclination angle may be greater than 0° or 5° and may be less than 60°, 30°, or 20°. The first and second axes 141, 151 may be straight and/or curved lines.

Forming of the first and second hole 140, 150 is preferably done by grinding or cutting. The first and the second hole 140, 150 may be formed by the same rotating tool. In a first embodiment, the first hole 140 is formed prior to forming the second hole 150. However, it may also be possible to form the second hole 150 prior to forming the first hole 140.

The diameter of the rotating tool is preferably lower than the fastening element to be passed through the angulated channel 170. The first hole 140 and the second hole 150 may be formed with substantially the same diameter (in case of the first hole 140 particularly not taking into account an attachment region 160, if present). In an alternative embodiment of the present disclosure, the first hole 140 and the second hole 150 may be formed with different diameters, wherein preferably the diameter of the first hole 140 is larger than the diameter of the second hole 150.

An attachment region 160 may be formed on a first, apical side 120 of the dental component 110. The attachment region has a different cross-section perpendicular to the first axis 141 than the remainder of the first hole 140 including the end region 143. The cross-section may be larger (e. g. in presence of an indexing means) or smaller (e. g. in case of an integrally formed screw seat such as the one shown in FIGS. 7 and 8). Between an attachment region 160 and the end region 143 of the dental first hole 140, the first hole 140 preferably has a shape that is basically cylindrical. Similarly, the second hole 150 preferably has a shape along its extension that is basically cylindrical (the region of intersection between the first hole 140 and the second hole 150 may not be cylindrical).

In case of a cylindrical shape of the first and second holes 140, 150, the dental component 110 and the angulated channel 170 can advantageously be formed on a 3-axis-machine using a simple cylindrical milling tool or a drill. Thus, no special or expensive equipment or tools are necessary so that the channel 170 may be prepared in a dental lab or even at a dentist's office. Still, a dental component with a complete angulated channel may also be produced even more cost efficient at a central production site.

Moreover, using the same rotating tool during manufacturing of the dental component 110 according to one aspect allows to save time since a change of tools and, thus, any down-time of the machine is avoided.

The first and second holes 140, 150 forming the angulated channel provide for sufficient space to allow a fastening element to pass. In this respect, the flexibility in positioning and dimensioning of the first and second holes 140, 150 enables to limit the removal of material in accordance with the desired movement of a fastening element through the angulated channel 170. Thereby, the stability of the dental component 110 is enhanced and the risk of a failure of said component is reduced. Further, the manufacturing process of the dental component 110 may be rendered more efficient since less material is discarded during manufacturing.

Turning to FIGS. 3 and 4, these figures show another embodiment of a dental component in accordance with the present disclosure. In the following and concerning these and subsequent figures, the description will primarily be directed at features that differ from or are supplemented to the previously described dental component 110 for reasons of conciseness. Nonetheless, as the skilled person will particularly appreciate from the figures, the description of the features of previous embodiments generally also applies to the features of subsequent embodiments.

As illustrated in FIG. 3, the first hole 240 is also formed starting at a first entrance 242 on a first, in particular apical side 220 of the dental component 210 and extends along a first axis 241. However, the dome-shaped end region 243 of the first hole 240 comprises multiple curved concave portions 245. More specifically, the cross-section of the first hole 240 along the first axis 241 shows more than one curved concave portion (cf. FIG. 1). As illustrated in FIG. 3, the multiple curved concave portions 245 are preferably arranged asymmetrically relative to the first axis 241. As in relation to the previous embodiment, this provides sufficient space for a fastening element to pass between the first hole 240 and the second hole 250 while preventing unnecessary removal of material. Further, multiple curved concave portions 245 allow for a better approximation of the shape of the end region 243 to the path of insertion of a fixation element.

As illustrated in FIGS. 3 to 9B, where the end region 243 comprises multiple (i. e. more than one) curved concave portions 245, these portions are particularly transitioning from one to the other (i. e. they are directly adjacent to each other).

Turning to FIG. 4, the dental component 210 of FIG. 3 is supplemented with a second hole 250 extending from a second entrance 252 on a second, coronal side 230 of the dental component 210 extending along a second axis 251. The first hole 240 and the second hole 250 intersect each other and form an angulated channel 270. Similar to the previous embodiment, at least a section of at least one of the curved concave portions 245 forms at least a part of the angulated channel 270. In other words, the line of intersection 253 of the first hole 240 and the second hole 250 is at least partly formed by at least a portion of at least one of the curved concave portions 245.

The curved concave portions 245 provide a smoother and material saving transition of the angulated channel 270 between the first hole 240 and the second hole 250. The curved concave portions 245 particularly achieve a smoother transition between a central axis of the end region 243 of the first hole 240 and the second axis 251 of the second hole 250, thus enhancing the transition between the first and second holes 240, 250. This allows for a smoother insertion and removal of a fastening element that is moved through the angulated channel 270.

Further, since sharp edges between the end region 243 to the second hole 250 are reduced, the handling of the fastening element is improved. In particular above-described rotational movement of the fastening element during a movement between a direction along the first axis 241 and a direction along the second axis 251 is improved.

The first hole 240 is preferably formed with a rotating tool guided substantially along the first axis 241. The curved concave portions 245 are then formed by subsequent orbital movements of the tool along a path extending approximately halfway about the first axis (preferably about 90° to 225°). The center of the path is preferably located on the side opposite to the side, where the second axis 251 extends to the second entrance 252. The subsequent paths followed by the tool have an increasing distance relative to the first axis 241 in an apical direction of the end region 243 of the first hole 240.

By performing orbital milling, the cross-section of the first hole 240 may be manipulated from a substantially circular cross-section to an oval or elliptic cross-section.

The multiple curved concave portions 245 may also be formed by a wobbling rotating tool as will be described further below in more detail under reference to FIGS. 9A and 9B.

Forming the first hole 240 and forming the curved concave portions 245 is preferably performed with the same rotating tool. Nonetheless, the rotating tool may also be changed after forming the basic geometry of the first hole 240. Then, another rotating tool with a smaller diameter may be used for forming the curved concave portions 245. The rotating tool may be displaced radially and substantially parallel to the first axis 241 and then translated along the radially displaced axis in a number of subsequent steps for following above-noted subsequent paths.

The second hole 250 is preferably formed by the same rotating tool used for forming the first hole 240. In an alternative embodiment, the second hole 250 may also be formed with another rotating tool, in particular when having a different diameter. As described above, the second hole 250 may be formed with substantially the same diameter as the first hole 240 or with a diameter smaller than the diameter of the first hole 240. Also in this embodiment, it is pointed out that the first hole 240 may be formed prior to forming the second hole 250, the second hole 250 may be formed prior to forming the first hole 240, or the holes 240, 250 may be formed at least partly simultaneously.

The manufacturing steps allow for a smoother transition of the angulated channel 270 at the intersection between the first hole 240 and the second hole 250, since an ideal continuous transition between the first hole 240 and the second hole 250 is approximated. The space necessary to allow for a fastening element to be moved through the angulated channel 270 is thus optimized which results in less (unnecessary) removal of material. This further enhances the stability of the dental component 210. Like in the previous embodiment, manufacturing may again be performed on a 3-axis machine.

The uppermost illustration in FIG. 5 basically illustrates a first hole 340 along a first axis 341 that corresponds to the first hole 140 depicted in FIG. 1. In this, illustration, the first hole 340 is formed by a rotating tool along a first axis 341 and includes an attachment region.

Further, the two illustrations of a first hole 340 below the uppermost illustration, depict two subsequent steps of forming the dome-shaped end region of the first hole 340 (shown as a negative, i.e., as a body) including multiple curved concave portions 345 similar to the second embodiment of FIGS. 3 and 4. In the second (middle) illustration, a first concave portion 345 is formed by a rotating tool, preferably performing orbital milling. Thereby, the diameter of the first hole 340 is enlarged along a portion of the first axis 341. In the third (lowest) illustration, further curved concave portions 345 have been formed in order to approximate a continuous transition between the first hole 340 and a second hole (not shown).

FIG. 6 shows a cross-sectional view of an angulated channel 470 in an abutment comprising curved concave portions 445 like the ones illustrated in FIGS. 3 to 5. As previously described, the second hole 450 is formed along a second axis 451 such that it intersects a first hole 440 so that at least a portion of the end section 443 of the first hole 440 is kept. As further shown in FIG. 6, at least a portion of at least one of the curved concave portions 445 forms at least a section of the angulated channel 470. Also, the line of intersection 453 between the first hole 440 and the second hole 450 is at least partly formed by at least one of the curved concave portions 445.

Turning to FIGS. 7 and 8, yet another embodiment of the disclosure is illustrated. According to FIG. 7, a first hole 540 is formed starting at an entrance 542 on a first, in particular apical side 520 of a dental component 510 and is manufactured substantially along a first axis 541.

Similar to the second and third illustration of FIG. 5, the first hole 540 comprises a screw seat 546, i.e. a region along the first axis 541 of the first hole 540 that is generated by a reduced diameter. As illustrated, the screw seat 546 may be formed at substantially 90° with respect to the first axis 541. The screw seat 546 may be formed by orbital milling.

Nonetheless, it may also be formed at an angle, i. e. with conical shape, as will be described in relation to FIG. 9.

Further and in contrast to the two illustrations of FIG. 5, an assembly region is arranged apically along the first axis 541 and relative to the screw seat 546.

As already described in more detail above, the first hole 540 is manufactured as a blind hole which comprises an end region 543 including curved concave portions 545 (cf. FIGS. 3 to 6).

In FIG. 8, a second hole 550 has been machined into the dental component 510 of FIG. 7. Like in the previous embodiments, the second hole 550 is formed starting from an entrance 552 at a side facing to the opposite side in relation to the apical side 520 and extends or has been machined along a second axis 551 of the second hole 550.

FIG. 9A illustrates yet another embodiment of a dental component 610. In general, the depth of component 610 has a design similar to the one shown in FIGS. 7 and 8. However and in contrast to the previous embodiment, the end region 643 of the first hole 640 has been manufactured using a rotating tool that performs a wobbling motion. Due to the wobbling motion, the end region 643 is manufactured with multiple curved concave portions 645.

As a result of the wobbling motion, the first hole 640 also comprises a conical portion that is located apically to the intersection between the first hole 640 and a second hole 650. The conical portion tapers along the first axis 641 of the first hole 640 and may be used as a conical screw seat 646.

Figure 9B:
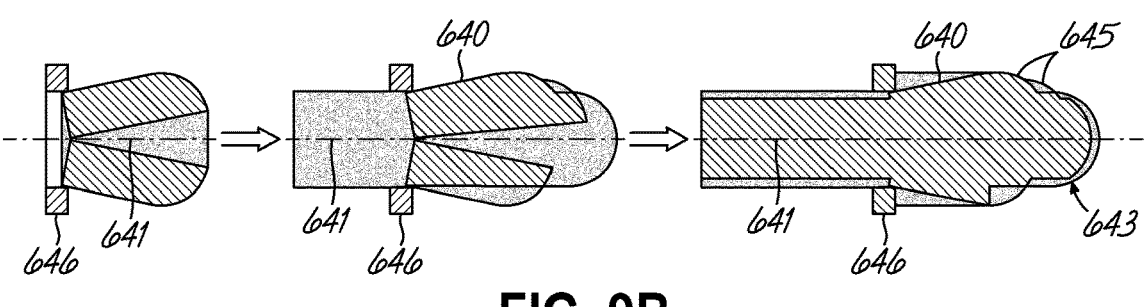

FIG. 9B illustrates in three steps how the first hole 640 is created using a wobbling rotating tool. During the wobbling motion, the rotating tool performs two superimposed movements, one movement is a rotating movement around the axis of the rotating tool and the second movement is a rotation about an axis which is inclined relative to the axis of the rotating tool and parallel to the first axis 641 of the first hole 640.

This is different than the orbital milling described above, where a rotating tool also performs two superimposed movements, one is a rotation about the axis of the rotating tool, the second is a rotation (circular, orbital) movement along a path about an orbiting axis (e. g. the first axis).

By the wobbling motion of the rotating tool, the diameter of a bore or hole is not created with a single diameter but a plurality of diameters that vary along the orbiting axis of the tool. The wobbling motion of the rotating tool allows for machining areas which are otherwise hard to access.

It is schematically illustrated in FIG. 9B how the first hole 640 and a conical shape that may be used as a screw seat 646 is formed behind an opening with a reduced diameter in a direction of insertion of the rotating tool. As shown, the rotating tool is inserted beyond the opening at the level of the optional screw seat 646 while moving about above-noted axes. Thereby, the optional screw seat 646 is formed with a conical shape while machining a first hole 640 that substantially extends along the first axis 641. Further, the at least one curved concave portion 645 is also formed by the tip of the wobbling rotating tool and at a coronal end portion 643 of the first hole 640.

Figure 10:
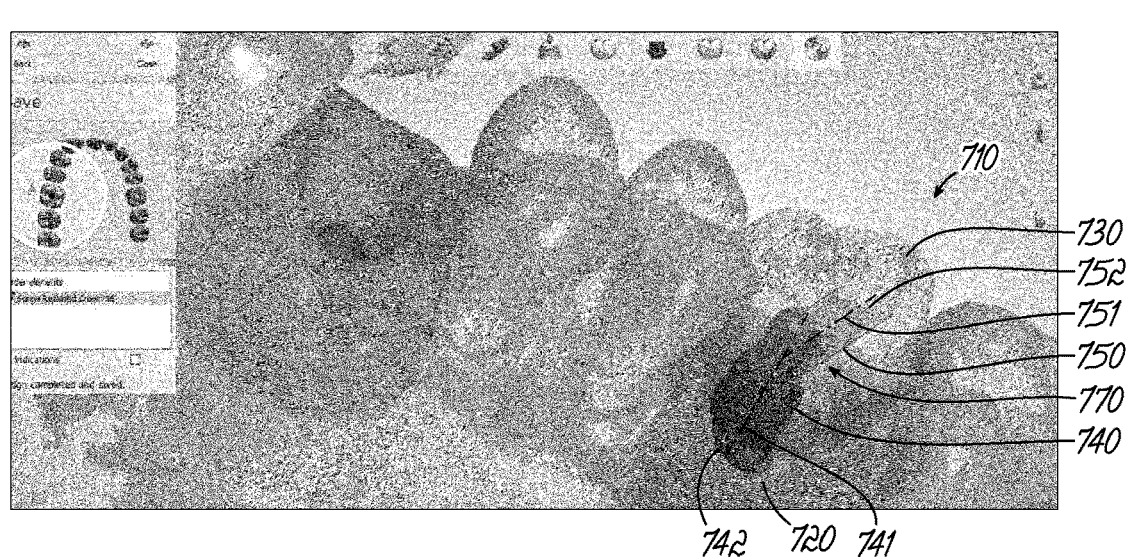
FIG. 10 illustrates the creation of a dental component with an angulated channel using a software interface.

Turning to FIG. 10, a software for designing a dental component or CAD software according to the present disclosure is illustrated. A virtual patient situation is provided within a virtual environment. A user subsequently designs a dental component 710.

The shape, position and/or orientation of a first hole 740 with a coronal end region having a dome shape or the other above-mentioned circular shape is calculated and appears at the correct location within a virtual dental component 710.

Before or after this, the user may adjust the position and/or orientation of the second hole 750, for example by placing a second entrance 752 on a side of the dental component 710 with a low visibility (in the figure a coronal side). Starting from the second entrance, the second hole 750 extends along a second axis 751. The user may choose the orientation of the second hole 750 around the first axis 741 (between 0 and 360° around the first axis 741). The second hole is created in such a way that at least a part of the end region of the first hole is kept as a part of the (virtual) angulated channel 770.

Depending on the position of the dental component (in FIG. 10, the dental restoration), different ways may be offered to a user in order to design in a virtual environment a customized solution to a patient. For example, the user may have the option to adjust the position of the second hole 750 in order to be able to take aesthetic aspects into account such that the second hole is at least less visible from outside the mouth of a patient. The user may also be provided with the possibility to design the dental component according to structural aspects starting from the dental implant.

Geometrical information of the new dental component 710 are send to a CAM system for manufacturing the dental component with the appropriate angulated screw channel according to the invention.

REFERENCE SIGNS

In the provided figures, the last two digits of the reference signs refer to features throughout the drawings that have the same or an equivalent function and/or structure. The preceding digits denote the embodiment. For this reason, the list of reference signs only refers to the last two digits of the reference signs.

10 dental component
11 intersection point
20 first, apical side
30 second, coronal side
40 first hole
41 first axis
42 first entrance (opening)
43 end region
45 curved concave portion
46 screw seat
50 second hole
51 second axis
52 second entrance (opening)
53 line of intersection or intersecting contour
60 attachment region
61, 62 varying diameters of attachment region
63 indexing means
70 angulated channel
The invention claimed is:

1. A method of manufacturing a dental component with an angulated channel for being mounted to a dental implant, wherein the dental component has a coronal side and an apical side, the method comprising the steps:

forming a first hole substantially extending along a first axis, the first hole having an end region away from the apical side;

forming a second hole substantially extending along a second axis, an entrance to the second hole being located coronally to the end region of the first hole, wherein the first hole and the second hole are formed to intersect each other for creating an angulated channel, wherein the first axis and the second axis are inclined with respect to each other, wherein at least a part of the end region of the first hole is kept as a part of the angulated channel, wherein forming the first hole includes forming a profile of the end region such that, in a cross-section extending along the first axis, the profile includes multiple curved concave portions including a first curved concave portion having a first diameter and a second curved concave portion having a second diameter, and wherein the first diameter is greater than the second diameter and the first diameter is closer to the apical side along the first axis than the second diameter.

2. The method of claim 1, wherein the end region of the first hole is formed such that it is located coronally to a point of intersection between the first axis and the second axis.

3. The method of claim 1, wherein at least a section of the multiple curved concave portions forms a part of the angulated channel of the dental component.

4. The method of claim 1, wherein the first hole is formed before the second hole.

5. The method of claim 1, wherein an angle of inclination between the first and second axes is greater than 0° and equal to or less than 60°.

6. The method of claim 1, wherein an angle of inclination between the first and second axes is greater than 5° and equal to or less than 30°.

7. The method of claim 1, wherein a rotating tool performs a wobbling motion while creating the first hole by guiding the rotating tool along at least one path about the first axis, wherein a longitudinal axis of the rotating tool is arranged at an angle to the first axis.

8. The method of claim 1, wherein a rotating tool performs a wobbling motion while creating the first hole by guiding the rotating tool along at least one path about the first axis, wherein a longitudinal axis of the rotating tool is arranged at a constant angle to the first axis.

9. The method of claim 1, wherein the first hole is formed by orbital milling along at least one path about the first axis, wherein the rotating tool is oriented parallel to the first axis.

10. The method of claim 1, wherein the blank used for manufacturing the dental component is a green body made of a ceramic material.

11. A dental component for being mounted to a dental implant comprising:

an apical side and a coronal side, a first hole substantially extending along a first axis, the first hole having an end region away from the apical side, a second hole substantially extending along a second axis, an entrance to the second hole being located coronally to the end region of the first hole, wherein the first hole and the second hole are formed to intersect each other creating an angulated channel, wherein the first axis and the second axis are inclined with respect to each other, wherein at least a part of the end region of the first hole is kept as part of the angulated channel, wherein in a cross-section extending along the first axis, a profile of the end region comprises multiple curved concave portions including a first curved concave portion having a first diameter and a second curved concave portion having a second diameter, and wherein the first diameter is greater than the second diameter and the first diameter is closer to the apical side along the first axis than the second diameter.

12. The dental component of claim 11, wherein a diameter of the first hole is equal to or larger than a diameter of the second hole.

13. The dental component of claim 11, wherein the first axis and/or the second axis is straight.

14. The dental component of claim 11, wherein the end region of the first hole has a decreasing cross-section perpendicular to the first axis.

15. The dental component of claim 11, wherein the angulated channel of the dental component has a conical screw seat.

16. The dental component of claim 11, wherein the end region of the first hole is located coronally to a point of intersection between the first axis and the second axis.

17. A method of designing a virtual dental component using CAD/CAM, the method comprising the steps:

providing geometric data of a dental component, creating a first hole geometry in the dental component, wherein the first hole extends substantially along a first axis the first hole having an end region away from the apical side, creating a second hole geometry in the dental component, wherein the second hole extends substantially along a second axis, an entrance of the second hole being located coronally to the end region of the first hole, wherein the first hole and the second hole are created to intersect each other for creating an angulated channel, wherein the first axis and the second axis are inclined with respect to each other, wherein at least a part of the end region of the first hole is kept as a part of the angulated channel, wherein in a cross-section extending along the first axis, a profile of the end region comprises multiple curved concave portions including a first curved concave portion having a first diameter and a second curved concave portion having a second diameter, and wherein the first diameter is greater than the second diameter and the first diameter is closer to the apical side along the first axis than the second diameter.

18. The method of designing the virtual dental component according to claim 17, wherein the end region of the first hole is created such that it is located coronally to a point of intersection between the first axis and the second axis.

19. A dental component manufactured according to claim 1.

* * * * *